Aug. 25, 1931.  J. LEDWINKA  1,820,079
PRESSED METAL AUTOMOBILE BODY
Filed Jan. 9, 1926   2 Sheets-Sheet 1
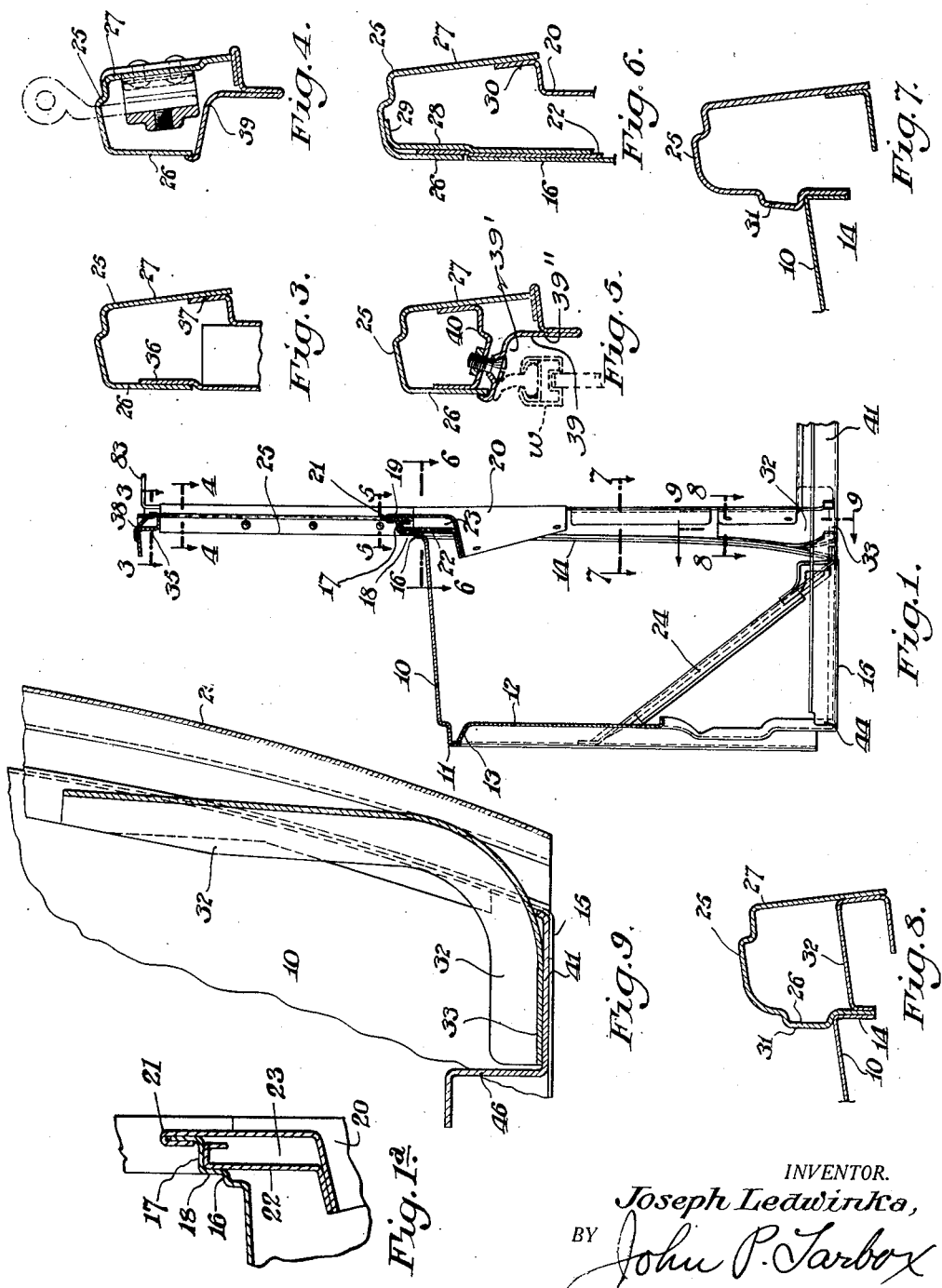
INVENTOR.
Joseph Ledwinka,
BY John P. Tarbox
ATTORNEY.

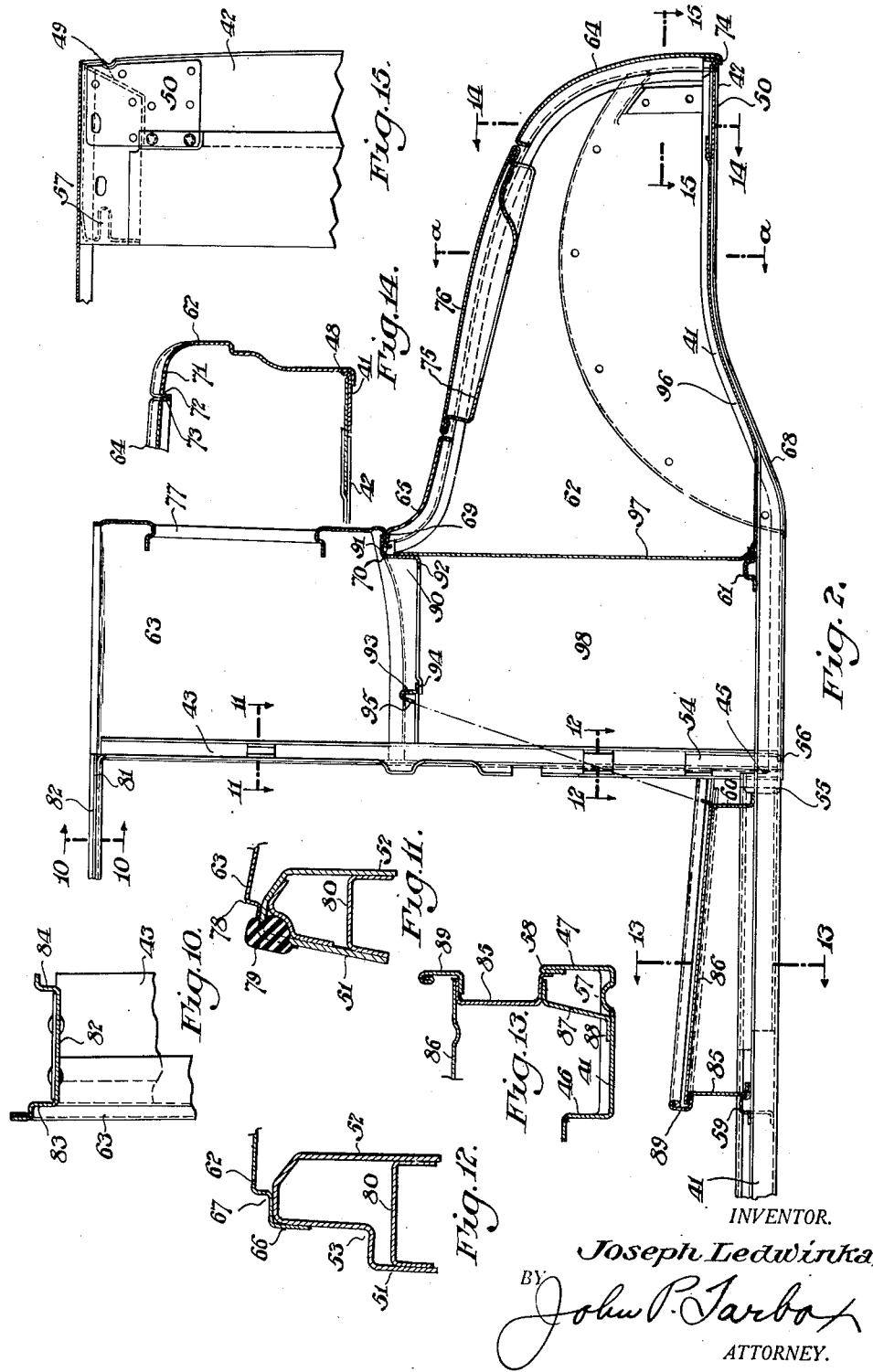

Patented Aug. 25, 1931

1,820,079

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

PRESSED METAL AUTOMOBILE BODY

Application filed January 9, 1926. Serial No. 80,363.

This invention relates to automobile bodies of the closed type, in this particular instance to that type known as the coupé, comprised of sheet steel stampings which are combined and united by electric welding into an integral whole.

One of the principal objects of the invention is to provide an automobile body construction which is particularly strong, durable and safe and which is especially applicable to the economical manufacture of coupé bodies.

A further object of the invention is to provide an automobile body which is built up of several major units or assemblies. This provision of unit construction affects not only a considerable saving in the cost of manufacturing the completed body, but it also affords considerable saving in space per unit of weight during both the steps of manufacture and shipment. Further, not only is the cost of manufacturing reduced and the speed of production increased, but a body built up in this manner has the advantage that without the necessity for special fitting one unit, or or indeed any element in any one unit, is replaceable by another similar unit or element whenever necessity demands or requires such replacement.

A still further object of the invention is to provide an automobile body of such simplicity as makes possible the attainment to the utmost of decreased cost of material, fabrication and assembly as well as decreased weight of the completed body.

A still further object of the invention is the provision of a new and improved design of body sill extending longitudinally throughout the entire length of the body, the sill being reinforced by the provision of ribs which are pressed or stamped in the body of the sill.

A still further object is the provision of an improved rear unit design such as makes possible the use of a wider door whereby the range of vision when looking toward the side and rear of the car is considerably increased.

Other objects of the invention will appear more fully hereinafter.

The invention consists substantially in the construction, combination, location and relative arrangement of parts all as will be more fully set forth and shown in the accompanying drawings and finally pointed out in the appended claims.

Referring to the accompanying drawings.

Figure 1 is a central longitudinal section of the cowl unit.

Figure 1a is an enlarged detail view of the lower windshield header construction as shown in Figure 1.

Figure 2 is a similar section of the rear unit showing the seat unit and top side rail in position.

Figures 3 to 9 inclusive are sections taken on the corresponding lines of Figure 1.

Figures 10 to 15 inclusive are sections taken on the corresponding lines of Figure 2.

The same part is designated by the same reference numeral wherever it occurs throughout the several views.

In the accomplishment of the foregoing objects and purpose I propose to construct the automobile body out of sheet steel stampings which are pressed or stamped into the desired shape or contour and are assembled and secured together to produce a single integral homogeneous structure.

Referring to the drawings and more particularly to Figures 1 and 2, it will be seen that the body comprises essentially a pair of major units, namely, the forward or cowl unit and the main body or rear unit. These major units are each separately and independently fabricated to form complete units which are in turn combined and joined together integrally to form the completed automobile body.

The cowl unit or assembly comprises in the main a cowl panel 10 formed preferably in one section as shown. At its forward edge this cowl panel 10 is provided with an inturned flange 11 to which is secured, preferably by welding, a shroud pan 12. This shroud pan 12 along its sides and top is provided with a forwardly inclined portion 13 so that its outer periphery forms together with the forward edge of the cowl panel the fore part of the cowl unit. The rear vertical edges of the cowl panel 10 are each provided with an inturned flange 14 while the bottom edges thereof are provided with inturned flanges 15. Formed integrally at the top rear edge of the cowl panel 10 is an upstanding flange 16 of generally double Z-shaped cross section and having the web 17 and the arms 18 and 19. As is most clearly shown in Figure 1 an instrument board support 20 is suspended from this transversely extending flange 16, it being secured thereto by clinching its upper edge over the free edge of the portion 19 of the cowl panel as is shown at 21.

Serving as a supplemental brace for the instrument board support 20 is a transversely extending panel 22 of substantially Z-shaped cross section having its upper portion seated and secured, preferably by welding, in the shoulder formed by the portions 17 and 18 of the transversely extending flange 16. Not only does this member 22 serve to brace the instrument board support but it also constitutes together with the vertical portion of the instrument board support 20 and the upper portion of flange 16 a closed box girder 23 extending from side to side of the cowl unit.

A toe board support 24 has its upper forward end secured to the forward flange 11 of the cowl and to the shroud pan 12, the lower rear end of the toe board support being spaced slightly above the plane of the inturned flange 15 so as to accommodate the body side sill in a manner to be described hereinafter.

Forming part of the cowl unit and secured to the rear vertical flanges 14 thereof of the cowl panel 10 are a pair of front door or A posts designated generally by the reference number 25. This A post 25 which varies in the depth of its walls 26 and 27 at different elevations thereof, is substantially uniform throughout in that it is generally of channel cross section presenting inwardly of the body, the wall 26 being the forward wall of the post and the wall 27 being the rear wall thereof. This is clearly shown in Figures 3 to 8 inclusive. In Figure 6 is shown the joint which is made between the cowl panel and the door post 25. Secured to the inner faces of the door post wall 26 and the transversely extending flange 16 is the instrument board support reinforcement 22 which latter is in turn reinforced by a gusset or bracket member 28 having a portion 29 thereof rigidly secured to the base wall of the A post. The instrument board support 20 is provided with an offset portion 30 which is directly secured as by welding to the inner face of the wall 27 of the A post 25. It will thus be seen that a very effective tie is provided between the A posts by members which together form the bottom rail of the windshield opening.

In Figures 7 and 8 is shown the manner of attaching the rear vertical flanges 14 of the cowl panel 10 to the door post 25 In this portion of the door post the forward wall 26 is provided with a forwardly pressed rib or bead 31 providing a shoulder in which to seat the rear vertical corner edge of the cowl panel. A bracket 32 of substantially inwardly presenting channel formation has its opposite walls secured to the inner faces of the walls 26 and 27 of the A post, the base of the bracket 32 swinging inwardly as at 33 to overhang the inturned flange 15 of the cowl panel. Space is provided, however, between the overhanging portion 33 of the bracket 32 and the inturned flange 15 of the cowl panel to accommodate the body side sill as in the case of the lower end of the toe board support 24.

The upper ends of the A posts 25 are joined together by a transversely extending peak panel 35 of substantially upwardly presenting channel shape. This peak panel is provided at its ends with extensions in the form of tabs 36 and 37 offset in such manner that they fit closely against the inner faces of the walls 26 and 27 of the A post respectively, these tabs 36 and 37 being welded thereto as is most clearly shown in Figure 3. Clips 38 spaced at intervals along the peak panel 35 serve to inter-brace the upstanding walls of the channel and constitute the upper windshield header in effect box girder for joining together the upper ends of the front door posts. That portion of the front or A post which extends between the bottom rail 16, 20 and 22 and the peak panel 35 has its side wall 26 facing forwardly of the body terminating at its inner edge a substantial distance short of the inner edge of the rear side wall 27 and has its opening or mouth covered by means of a cover plate or molding 39 which latter serves additionally as the side frame of the windshield $w$ and is provided with a rabbet or longitudinal recess, the rear wall 39" of which approximately parallels and transversely overlaps the rear side wall 27 of the main post member. The main post member with this cover plate or molding forms a hollow post structure of great strength while at the same time this construction reduces the overall width of the post in the line of vision from the driver's seat and thus insures a maximum range of vision forwardly. Clips 40 are provided at intervals for the reception of securing means for this molding 39. Secured in the usual manner at the top and bottom of the door post are the door hinges, only the upper hinge being shown as in Figure 4.

The construction of the rear portion of the body is best shown in Figures 2 and 11 to 15 inclusive. Just as in the cowl unit assembly, this rear unit comprises paneling assembled upon a supporting framework. This framework includes the body side sill members 41, the rear sill 42 and the rear door or B post 43, all of which are integrally joined together, preferably by welding. In this particular body construction the side sills 41, while forming part of the rear unit, extend throughout the entire length of the body, the fore end of the sill reaching to the front of the cowl unit as indicated at 44 in Figure 1, and the rear end thereof extending to the rear body sill 42 for joinder therewith. From the extreme forward end of the body sill to a point 45 just beyond the forward wall of the rear door post 43, the body sill is of generally channel shape formation presenting upwardly and including the side walls 46 and 47. Rearwardly of the point 45 the body sill has its outer wall of reduced depth but the sill continues of channel formation up to the usual "kick up", from which point rearwardly it is of angle formation, the vertically extending branch 48 thereof being a continuation rearwardly of the side wall 47 of the channel shaped body sill. That portion of the body sill 41 which is adapted to be telescoped into the cowl unit is of a cross section most clearly shown in Figure 9, the side wall 46 remaining intact but the wall 47 being considerably reduced in depth. This change in cross section of the fore part of the body sill adapts it to be projected in the final assembly of the cowl and rear units into the cowl unit with the base portion thereof disposed between the inwardly turned flange 15 of the cowl panel and the inwardly extending portion 33 of the bracket 32 and the lower end of the toe-board support 24.

The rear portion of the body side sill is provided with a kick-up portion in the usual manner. The rear body sill 42 is of simple angle formation as is most clearly shown in Figure 2. A joint at the ends of the side and rear sills is effected by forming the ends of the sills to complementally fit one with the other as is most clearly shown by the lines 49 in Figure 15. A gusset plate 50 is positioned on adjacent portions of the side and rear sills and is welded thereto thus forming an effective tie at the corners of the lower supporting structure of the body.

Mounted intermediately of the ends of the body sill is the rear door or B post 43, this post being of substantially inwardly presenting channel formation having the side walls 51 and 52. The forward wall 51 throughout the lower section of this door post 43 is provided with a rabbeted portion 53 for the accommodation therein of the inner edge of the door. The bottom of the post is secured to the body side sill 41 by the provision of a channel shaped bracket 54 seated within the hollow of the post, this bracket being provided with a forwardly turned tab 55 for securement to the exterior of the wall 47 of the body side sill and an inturned tab 56 for securement to the base of the body sill. To give strength to the body side sills they are provided with reinforcements in the form of a plurality of longitudinally extending beads 57 as is best shown in Figs. 13 and 15 while those portions of the body sills forming the threshold portions of the body are at the upper edges of the outer walls 47 provided with inturned beads 58. This beading 58 not only constitutes a reinforcement for the sill at the point at which body sag is most likely to occur but also lends a neat and finished appearance thereto. Cross members 59, 60 and 61 serve to interconnect and interbrace the side sill members 41, the cross members 59 and 61 being of inverted channel shape while the member 60 is of Z cross section.

The outer paneling of the rear section of the body consists primarily of four main sections, these sections being the side panels 62, the upper back panel 63, the lower deck panel 64 and the upper deck panel 65. The panels 62, 64 and 65 when joined together constitute the lower section of the paneling and form the seat upon which the upper rear panel 63 is mounted. The side panels 62 are provided at their forward vertical edges with inwardly extending flanges 66, there being provided in this inturned flange 66 a rabbeted portion 67 for the accommodation of the outer overlap of the door. The bottom edges of the side panels 62 are provided with inturned flanges 68 for securement to the bottom of the side sills 41. The forward upper edges of the side panels 62 are provided with inturned flanges which are formed complementally with similar adjoining flanges on the lower edge of the upper rear panel 63, these inturned flanges being welded together in the manner best shown at 69 of Fig. 2. The inwardly turned flanges at the bottom edge of the panel 63 are provided with depending portions 70 overlying the free edge of the inturned flanges at top of the side panels 62 thus providing a reinforecement as well as a neat appearing finish for the inner edge of the joint.

The upper edges of the side panels 62 rearwardly of the portions thereof underlying the upper panel 63 are arched inwardly as at 71 in Fig. 14, the inner edges of these arched portions being provided with depending flanges 72. Extending transversely between these depending flanges 72 are the rear upper and lower deck panels 65 and 64, respectively, said panels being provided along their side edges with depending flanges 73 for joinder, as by welding, with the flanges 72 of the side panels 62. The forward edge of the upper deck panel 65 is provided with a flange 69 underlying the transversely extending bottom flange of the panel 63 in a manner similar to the joinder between the adjacent flanges of the panels 62 and 63. The rear edge of the lower deck panel 64 is provided with an inturned flange 74 underlying the rear sill 42. As is clearly shown in Fig. 2 the lower and upper rear deck panels 64 and 65 are spaced from each other to form an opening in the top of the rear deck which opening is adapted to be closed by a cover comprised of inner and outer panels 75, 76 and closely fitting therein.

The upper panel 63 extends from the door post 43 on one side of the body to the door post 43 on the other side of the body and is provided in its rear side with a rear window opening 77. The forward vertical edges of this panel 63 are provided with inturned flanges 78 rabbeted in continuation of the forward vertical edges of the panel 62 to accommodate the outer overlap of the upper portion of the door. As is clearly shown in Fig. 11, this inturned flange 78 is provided with an opening formed complementally with an opening in the door post for the accommodation of a door bumper 79 of rubber or other such resilient material. The B post structure is completed by the addition of upholstery securing clips 80 extending across the free edges of the door post and spaced at suitable intervals throughout the length thereof. These clip members 80 serve additionally as efficient means for bracing the side walls of the post.

At the top of the post 43 the forward wall 53 is extended forwardly in the form of a lip or tab 81 to which is adapted to be secured by riveting or otherwise the rear end of a side top rail or header 82. Cooperating with the tab 81 formed on the B post 43 is a similar rearwardly extending tab 83 formed on the rear wall 27 of the A post 25. The top rail 82 which has its forward and rear ends secured respectively to these tabs 83 and 81 is of substantially upwardly presenting channel formation having the outer rabbeted wall 83' and the inner wall 84. These side top rails 82 are not secured into position until after the front and rear main units have been assembled whereupon the top rails form the supporting elements for the sides of the roof unit.

As with the side top rails 82 the front seat unit is also not secured in position until after the main units of the body have been finally assembled. This front seat unit comprises a front heel board 85 of substantially Z shaped section extending transversely between the side sills 41 and seated upon the rearwardly extending flange of the cross member 59. This heel board panel cooperates with the rear riser, in the form of the Z shaped cross member 60, to support the seat pan 86. The heel board panel 85 as clearly appears from Fig. 13 is of generally U form extending approximately from post to post of the body, the sides of this panel 85 being supported by a Z shaped member 87 having its bottom inwardly extending arm 88 founded upon the bottom wall of the sill 41. The cushion retaining member 89 extends around the sides and front and is secured to the upper edge of the heel board panel 85.

Following the major portion of the joint between the lower side panels 62 and the upper rear panel 63 at the inner edge thereof is a U shaped stamping 90 of substantially Z cross section having the laterally extending arms 91 and 92. The arm 91 rests upon the ledge formed by the flanged joint between the upper panel 63 and the side and upper deck panels 62 and 65, thus leaving an inwardly extending flange 92 of generally U-shape. Interconnecting the forward free ends of this stamping 90 and resting upon the inwardly extending flanges 92 is a stamping 93 having a rearwardly extending flange 94 and a forwardly and downwardly turned flange 95, the latter flange lying substantially in the plane of the back of the front seat and serving as a rest for the upper edge of the rear seat cushion.

Extending transversely of the body rearwardly of the rear cross member 61 and founded upon the inwardly extending flanges of the side sills 41 is the rear compartment flooring or bottom 96. A partition 97 of wood or other material, extends vertically from the forward edge of the rear compartment bottom 96 into the space formed between the flange 70 and the stamping 90 thus forming a separate compartment 98 immediately to the rear of the seat back. This compartment 98 may be provided with a cover supported by the flanges 92 and 94 forming side rails therefor.

Such is the body construction which constitutes the invention claimed. Not only is the body extremely simple and strong but it lends itself to flexible adaptation to any contour lines of any description such as might be desired by the customer. Not only this but the body is constructed in units which lend themselves to ready and efficient sub-assembly. As has been described above the major units of this body are the cowl or forward unit and the rear unit. The cowl unit includes no part whatever of the side sills 41 or of the side top rails 82 of the body. The front door or A posts 25 which are carried by the rear vertical flanges of the cowl panel 10 extend downwardly as respects their inner portions including the portion 33 of the bracket 32, to a point just above the bottom line of the cowl unit, a distance sufficient to accommodate telescoping the forward portions of the body side sills. As shown in Figs. 1 and 9, the outer portions of the posts are extended down outside the outer wall of the sill and secured thereto by a tab indicated in dotted lines in Fig. 1 similar to the tab 55 at the B-post. The A posts carry, secured in place, the hinge supporting and joint reinforcing bracket member 32 at the bottom thereof, while at the top they are provided with the integral rearwardly extending tabs or lips 83 to which are adapted to be secured the forward ends of the top rails. Extending transversely of the tops of the A posts is the top rail or peak panel 35 while also extending transversely of the A posts, but from points intermediate the tops and bottoms thereof is the transversely extending bottom rail 16, 20, 22, an improved element of this bottom rail being the transverse extension 16 formed integrally at the rear edge of the cowl panel 10. The front cowl unit includes additionally the toe board support 24 and the instrument board 20, the latter when assembled forming a part of the bottom rail of the windshield frame.

The main body or rear unit comprises the side sills 41, the rear body sill 42 and the B posts 43 extending vertically from a point intermediate the front and rear ends of the side sills. Secured to this understructure are the panels 62, 63, 64 and 65 which when joined together, preferably by welding, form a substantially integral rear panel unit having provided therein the rear compartment opening and the rear window opening 77. To assemble the front and rear major units together necessitates only a forward movement of the rear unit with respect to the other unit such that the fore ends of the sills 41, these portions being of a cross section such as is shown in Fig. 9, are projected forwardly into the front or cowl unit between the bottom flanges 15 thereof and the inturned portions 33 of the bracket 32 and the bottom of the toe-board supports 24. The bracket 32 and toe-board support 24 are then rigidly secured to the body sill as is the inturned flange 15 to effect a substantial joinder of the front and rear units. The front seat assembly may then be positioned in its proper place in the body. The side top rails 82 may be secured in place with the ends thereof founded upon the tops of the A and B posts, the joint between the ends of the rails 82 and the posts being more securely effected by reason of the tabs 81 and 83.

It is, of course, to be understood that this invention is capable of many modifications and variations. In the appended claims in which the several features of the foregoing invention have been broadly claimed, it is intended to cover any and all of such modifications and variations as may be devised.

What I claim as new and useful is:—

1. In a pressed metal automobile body construction, a cowl panel having a transversely extending portion at the rear thereof, an instrument board support secured to said transversely extending portion to form therewith an inverted channel, said support having one portion thereof projecting forwardly of the body, and a reinforcing member of angular cross section having one portion seated in and secured to the bottom of said channel and the other portion founded upon and secured to the forwardly projecting portion of the instrument board support.

2. In a pressed metal automobile body construction, a pair of front door posts of channel formation presenting inwardly of the body, a cowl panel to the rear vertical edges of which said posts are secured, said cowl panel being provided with a vertically extending portion extending transversely at the rear of the panel, the ends of said vertically extending portion terminating in substantially abutting relationship with the inner edges of the forward walls of the door posts.

3. In a pressed metal automobile body construction, a pair of front door posts of channel formation presenting inwardly of the body, a cowl panel to the rear vertical edges of which said posts are secured, said panel being provided along its rear transverse edge with an integral upstanding portion, the forward walls of said door posts and said transverse portion lying in substantially the same vertical plane and gusset members overlying the adjacent inner faces of said posts and said transversely extending portion.

4. In a pressed metal automobile body construction, a longitudinally-extending body side sill having a threshold portion of channel formation, a longitudinally-extending stamping seated within and founded on the base of said channel, said stamping having an outwardly-extending flange terminating adjacent the outer wall of said channel.

5. In a pressed metal automobile body construction, a body side sill having a portion of substantially channel formation, a stamping of substantially Z-shape seated within and secured to the base of said channel, and a heel board panel having its lower side edge mounted upon the upper branch of said stamping.

6. In a pressed metal automobile body construction, a body side sill having a portion of substantially channel formation, a longitudinally-extending stamping seated within said channel, said stamping having a laterally-extending flange spaced from the outer wall of said channel, and a heel board panel having a depending flange along its side edge, said depending flange being accommodated within said space.

7. In a pressed metal automobile body construction, a rear unit comprising upper and lower panel stampings extending from side to side of the body, said stampings being provided with an inwardly-extending ledge at their meeting edges, and a U-shaped stamping depending from said ledge, said U-shaped stamping being provided with a rail for the accommodation of a front compartment cover.

8. In a pressed metal automobile body construction, a rear unit comprising upper and lower panel stampings extending from side to side of the body, said stampings being provided with an inwardly-extending ledge at their meeting edges, and a U-shaped stamping depending from said ledge, said U-shaped stamping being of substantially Z cross section.

9. In a pressed metal automobile body construction, a pair of longitudinally-extending body side sills interconnected by a transversely-extending inverted channel, upper and lower panel stampings carried by said sills, a transversely-extending stamping overhanging the meeting edges of said panel stampings, and a partition having the lower edge thereof founded upon said channel and the upper edge thereof secured to said transversely-extending stamping.

10. In an automobile body construction, a pressed metal front post including a main stamping disposed at the side of a windshield opening and of a channel cross section presenting inwardly of the body, the front side wall of the channel having its inner edge terminate a substantial distance short of the inner edge of the rear side wall, and a member covering the mouth of the channel and formed with a longitudinal recess of angular cross section having a rear wall approximately paralleling the rear side wall of the post stamping and transversely overlapping the same, said recess being adapted to receive the edge of a windshield.

11. In an automobile body, a pressed metal front post structure of hollow form, the main portion of said structure being a stamping of channel cross section presenting inwardly of the body, the side wall of said hollow post structure facing forwardly of the body being offset rearwardly of the body in its inner portion to form a windshield edge receiving rabbet the rearwardly offset portion of said side wall transversely overlapping the rear side wall of said main channel section stamping.

In testimony whereof he hereunto affixes his signature.

JOSEPH LEDWINKA.